(12) United States Patent
Doyon et al.

(10) Patent No.: US 6,442,907 B1
(45) Date of Patent: Sep. 3, 2002

(54) WINDOW CASE

(75) Inventors: Raynald Doyon, St-Georges-Est; Florian Poulin, Charny; Armand Patenaude, Longueuil; Jacques Benmussa, Montréal, all of (CA)

(73) Assignee: 9068-4283 Quebec Inc., Beauceville (CA)

( * ) Notice: Subject to any disclaimer, the term of this patent is extended or adjusted under 35 U.S.C. 154(b) by 0 days.

(21) Appl. No.: 09/253,040

(22) Filed: Feb. 19, 1999

(30) Foreign Application Priority Data

Feb. 23, 1998 (CA) .............................. 2227687

(51) Int. Cl.[7] .............................. E04H 1/00; E04H 1/06
(52) U.S. Cl. ....................... 52/235; 52/204.5; 52/656.5; 52/745.16
(58) Field of Search ................... 52/235, 204.5, 52/204.1, 656.5, 745.1, 745.16

(56) References Cited

U.S. PATENT DOCUMENTS

| | | | | |
|---|---|---|---|---|
| 3,336,707 A | * | 8/1967 | Horgan ........................ 52/281 |
| 3,736,717 A | | 6/1973 | Farley |
| 3,932,974 A | | 1/1976 | Wright |
| 4,121,396 A | | 10/1978 | Oogami et al. |
| 4,251,964 A | | 2/1981 | Francis |
| 4,393,632 A | | 7/1983 | Levesque |
| 4,531,336 A | * | 7/1985 | Gartner ........................ 52/209 |
| 4,608,793 A | * | 9/1986 | Yost et al. ..................... 52/235 |
| 4,662,145 A | * | 5/1987 | Tanikawa et al. ........... 52/745.1 |
| 4,724,637 A | * | 2/1988 | Evans ........................... 52/209 |
| 4,803,817 A | | 2/1989 | White et al. |
| 4,809,475 A | * | 3/1989 | Emmer ........................ 52/235 |
| 4,999,960 A | * | 3/1991 | Herwegh et al. ............. 52/235 |
| 5,105,593 A | * | 4/1992 | Kaminaga et al. ............ 52/235 |
| 5,199,236 A | * | 4/1993 | Allen ........................... 52/235 |
| 5,212,922 A | | 5/1993 | Werner |
| 5,235,790 A | | 8/1993 | Ishikawa et al. |
| 5,245,808 A | | 9/1993 | Grunewald et al. |
| 5,301,484 A | | 4/1994 | Jansson |
| 5,355,645 A | * | 10/1994 | Farag .......................... 52/235 |
| 5,381,637 A | | 1/1995 | Farag |
| 5,452,552 A | * | 9/1995 | Ting ............................ 52/235 |
| 5,579,616 A | * | 12/1996 | Farag .......................... 52/235 |
| 5,603,789 A | * | 2/1997 | Whitmyer .................... 156/108 |
| 6,035,598 A | * | 3/2000 | Sukolics et al. .......... 52/506.08 |

FOREIGN PATENT DOCUMENTS

| | | |
|---|---|---|
| CA | 2002615 | 11/1989 |
| CA | 1286158 | 7/1991 |
| CA | 2050052 | 8/1991 |
| CA | 1298454 | 4/1992 |
| DE | 36 26 194 | 2/1988 |
| EP | 0 404 103 | 12/1990 |
| EP | 0 452 756 | 10/1991 |
| WO | WO 96/11310 | 4/1996 |

* cited by examiner

*Primary Examiner*—Gregory J. Strimbu
(74) *Attorney, Agent, or Firm*—Oblon, Spivak, McClelland, Maier & Neustadt, P.C.

(57) ABSTRACT

A window case includes a main frame formed of a pair of vertical sections and a pair of horizontal sections. Each section has an outwardly open U-shaped channel extending longitudinally along the section, each channel having a front sidewall, an inner bottom wall and a rear sidewall opposite the front sidewall. A limb extends longitudinally along each of the sections and frontwards from an outer edge portion of the front sidewall thereof. The limbs of each of the vertical sections and the horizontal sections together define an intermediate window frame. A pane frame securing a window pane is mounted on the intermediate window frame.

12 Claims, 9 Drawing Sheets

WINDOW CASE

FIELD OF THE INVENTION

The present invention relates generally to window and panel frame structures, and more particularly to a prefabricated window case that can be easily integrated with panel structures covering a building in order to provide a uniform appearance from the outside.

BACKGROUND OF THE INVENTION

In large commercial and institutional buildings of certain architectural styles, exterior panels of sheet-like form are more and more used. Those panels can be produced directly in factory and therefore can be rapidly installed on horizontal rails mounted on the facade of the building. A plurality of rows of such prefabricated wall panel structures made of different materiel such as stone, ceramic tile, glass or metal sheet may cover the building to provide an aesthetical facade. Although, the installation of those panels on a building can be done relatively rapidly, the construction progress of the facade is always slowed down with the installation of the windows. It is generally a puzzle work for the architects designing such a facade to accommodate the windows with the panels and obtain a nice appearance at the joint between a panel and a window. Aesthetically, the ultimate goal is to obtain a facade where the windows do not detract from the external sight lines of the panels.

A solution for a somewhat similar problem has been proposed in Canadian laid-open application no. 2,002,615. However, the opening window disclosed in that document is adapted to be used with a curtain wall system which is structurally very different from a panelled wall.

The following documents are other examples of related prior art window and/or panel frame structures: U.S. Pat. Nos. 3,736,717; 3,932,974; 4,121,396; 4,251,964; 4,393, 632; 4,803,817; 5,212,922; 5,235,790; 5,245,808; 5,301, 484; and 5,381,637; Canadian patents nos 1,286,158 and 1,298,454; and Canadian laid-open patent applications nos 2,002,615 and 2,050,052.

There is still presently a need for a window assembly that will be easy to combine with the above-described panels and that will give a uniform appearance to the exterior of the building.

The complete disclosure of U.S. patent application Ser. No. 09/252,826 entitled "PANEL STRUCTURE", filed by the same applicant and on the same day as the present application, is incorporated herein by reference.

SUMMARY OF THE INVENTION

An object of the present invention is to propose a window case that will satisfy the above-mentioned needs. The window case proposed therein can be easily prefabricated in factory and directly installed on the site of construction.

In accordance with the present invention, these objects are achieved with a prefabricated window case assembly for installation in a window opening of a building, the building having an exterior wall surface covered with rows of panel structures hooked side by side on supporting rails fixed to the exterior wall surface, the window case assembly comprising:

a box-shaped main frame formed of a pair of vertical sections and a pair of horizontal sections, each section having:

a rearward portion adapted to be recessed into the window opening of the building; and a frontward portion for protruding out of the building once the window case assembly is installed in the window opening, the frontward portion of each of the vertical sections and the horizontal sections defining together an intermediate window frame;

a pane frame sized to fit in the intermediate window frame and mounted therein, the pane frame being formed of a pair of vertical framing members and a pair of horizontal framing members, each of the framing members having a body mounted along a corresponding one of the frontward portions of the main frame and an arm extending frontwards and outwards from the body so as to substantially hide the main frame when viewed from outside the building, said arm of each framing member having a window pane securing portion; and a window pane having edges each secured to a corresponding one of said window pane securing portions of the pane frame.

Preferably, the rearward portion of each of the sections of the main frame comprises an outwards open U-shaped channel extending longitudinally along the section, the channel having a front sidewall, an inner bottom wall and a rear sidewall opposite the front sidewall. Also preferably, the frontward portion of each of the sections comprises a limb extending longitudinally along the section and frontwards from an outer edge portion of the front sidewall of the U-shaped channel.

In a particular embodiment of the invention, each of the sections has a hook-shaped engagement member adapted to interlock with a corresponding hook-shaped engagement member provided on an adjoining section of an adjacent window case.

The present invention also proposes a method of mounting a window case as described hereinbefore in an opening of an existing wall, the opening being defined by at least a base ledge. The method comprises the steps of:

a) setting the rearward portion of one of the horizontal sections of the main frame on the base ledge of the opening with the intermediate window frame and pane frame protruding from the existing wall; and b) affixing the rearward portion of the horizontal section of step a) to the base ledge.

The method preferably comprises, prior to step a), a step of:

mounting a bracket on the base ledge, the rearward portion of step a) being set on the bracket.

Also preferably, the method further comprises the steps of:

c) fixing an anchor plate to an outer surface of the frontward portion of the other horizontal section of the main frame such that the anchor plate extends longitudinally along the frontward portion and that a fixing part of the anchor plate extends beyond the rearward portionl of said other horizontal section; and d) securing the fixing part of the anchor plate to an overhanging ledge of the opening in the existing wall opposite the base ledge.

The method may further comprise a step of:

mounting another window case adjacent to the first installed window case such that the window cases each have an adjoining vertical section, the step comprising interlocking a hook-shaped engagement member provided on the adjoining vertical section of the first installed window case to a hook-shaped engagement member provided on the adjoining vertical section of the other window case.

The present invention also provides a building panel system covering the exterior wall surface of a building. This system comprises a plurality of rows of adjacent panel structures hooked on supporting rails mounted on the exterior wall surface of the building. The system further comprises at least one window case as described hereinbefore mounted in an opening of the exterior wall and disposed adjacent to a panel structure. The window pane of the window case and the adjacent panel structure have an adjoining edge and coplanar front surfaces.

A window case and a building panel system according to the present invention present the following advantages as compared to prior art curtain walls or conventional exterior wall with different types of facing in that it eliminates:

1) the mechanical joints between the aluminium transoms and mullions and the glass panes of a curtain wall;
2) the design problems related to the construction of different types of facings on a single wall;
3) the caulking step on the site of construction; and
4) the architectural puzzle to figure out a continuity between the panels and the windows.

Other objects, features and advantages of the invention should now become more apparent upon reading the following detailed description of a preferred embodiment taken in conjunction with the accompanying drawings.

BRIEF DESCRIPTION OF THE DRAWINGS

FIG. 5 is also a cross-sectional view along line V—V of FIG. 2;

Figure 1:
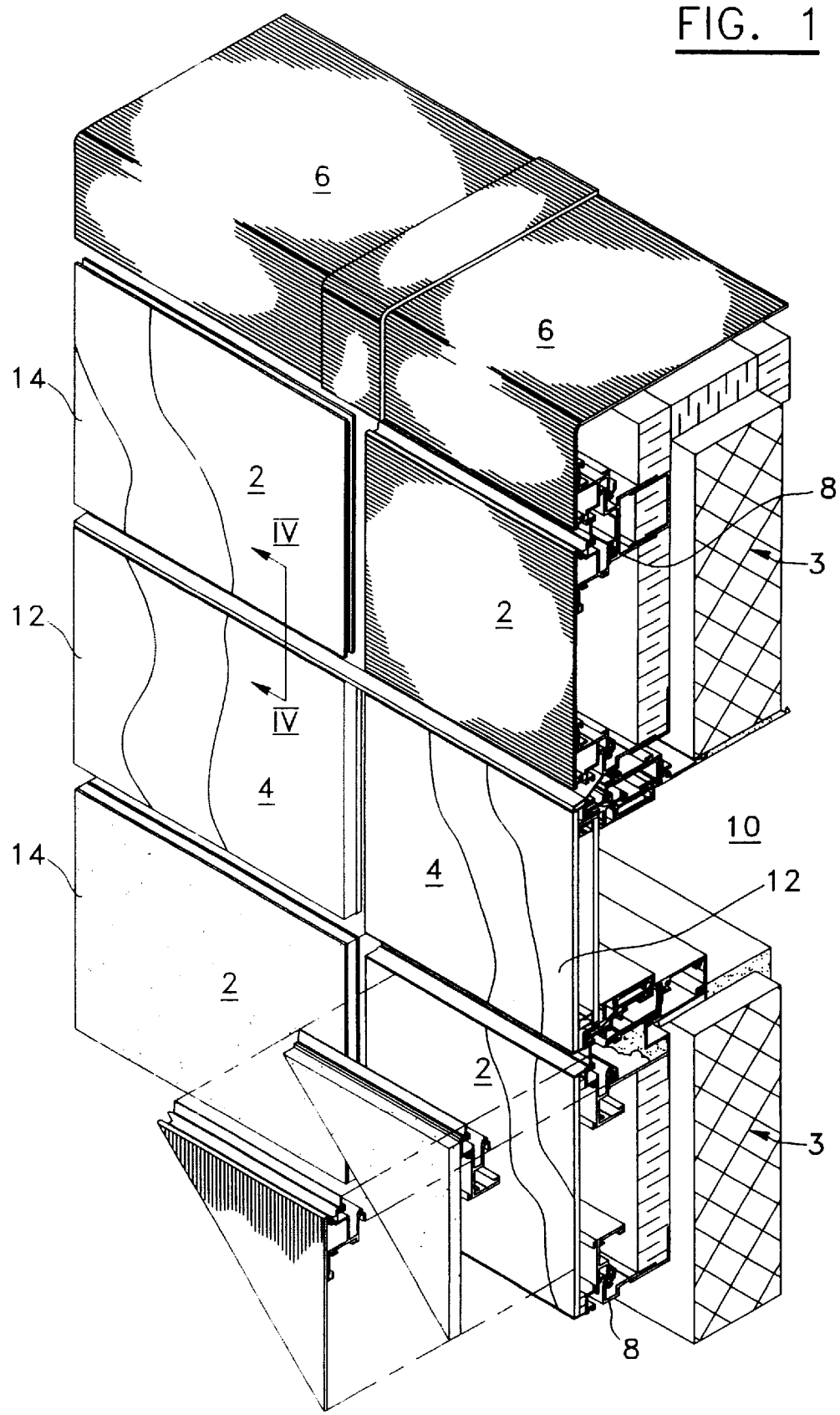
FIG. 1 is a sectional perspective view of a portion of a building panel system including two window cases according to a preferred embodiment of the invention.

NUMERAL REFERENCES OF THE ELEMENTS 2 panel structure
3 existing wall
4 window case
6 parapet
8 supporting rail
10 opening in the wall
12 window pane
14 front surface of a panel
20 main frame
22 sections of the main frame
22a) vertical sections
22b) horizontal sections
24 channel
26 front sidewall of the channel
28 bottom wall of the channel
30 rear sidewall of the channel
31 outer edge of the rear sidewall
32 limb
34 intermediate window frame
36 hook-shaped engagement member
 a) the first
 b) the second
40 pane frame
42a) vertical framing members
42b) horizontal framing members
44 body of the pane frame
46 arm of the pane frame
48 bonding portion of the arm
50 gap
52 thermal insulator
54 thermal insulator
56 strip of sealing material
58 gasket pocket
60 front glazing sheet
62 outline of the rear glazing sheet
64 rear glazing sheet
66 separator
68 outline rim of the front glazing sheet
70 edge cap
72 flange of the edge cap
74 gasket pocket
75 gasket pocket
76 strip of sealing material
78 finishing cover
80 hinge
82 handle
83 lock
84 base ledge of the opening
86 bracket
88 hook-shaped engagement member of the bracket
90 anchor plate
92 fixing part of the anchor plate
94 overhanging ledge of the opening
96 side ledge of the opening
98 urethan foam
100 water evacuation plate

DESCRIPTION OF PREFERRED EMBODIMENTS

A portion of a building panel system according to the present invention and covering the upper part of an existing wall (3) is illustrated in FIG. 1. More particularly, this portion shows two rows of panel structures (2) and one row of two window cases (4) disposed between the two rows of panel structures (2). This portion also shows two aluminum parapets (6) mounted on top of the building. The panel structures (2) are hooked side-by-side on supporting rails (8) fixed on the exterior wall surface (3) of the building and the window cases (4) are mounted in an opening (10) of the wall (3). As can be appreciated, for someone looking to the building, a joint between two panels or a joint between a window and a panel look alike and are not distinguishable because the window pane (12) of a window case (4) is coplanar with the front surface (14) of adjacent panel structure (2).

Figure 2:
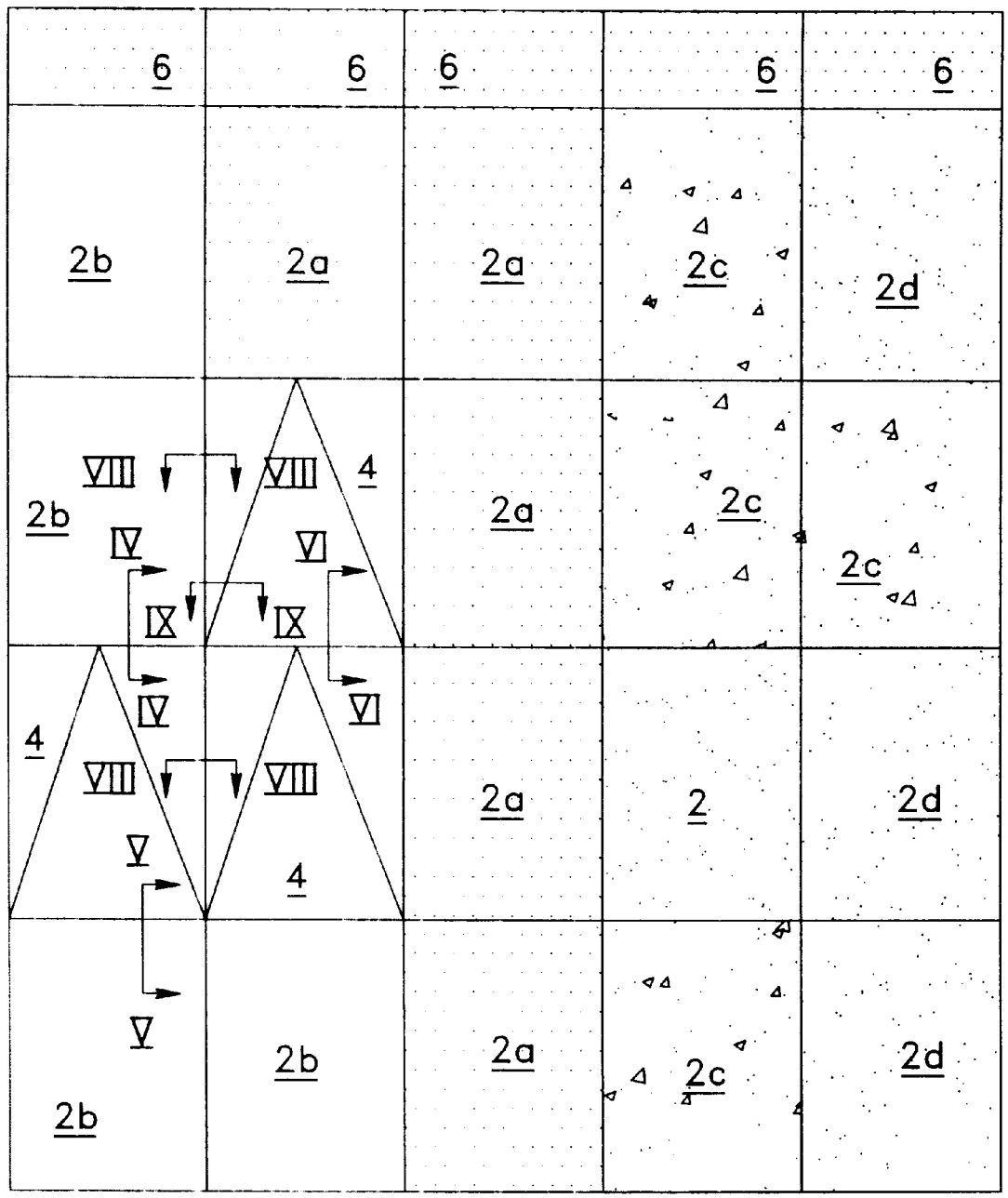
FIG. 2 is a schematic front view of a portion of another building panel system according to the present invention.

Another design of a building panel structure according to the present invention is illustrated in FIG. 2. This design comprises four rows of side-by-side panel structures (2) made of different material selected from among aluminum (2a), tympan glass panel (2b), concrete (2c), granite (2d) or any suitable material. Three window cases (4) are mounted between some of those panel structures (2).

Referring now more particularly to FIGS. 1 and 3 to 5, a preferred embodiment of a window case (4) according to the present invention will now be described in more details. In order not to overload these figures with too many numeral references, all the numeral references do not appear in a single figure. However each number can be found in at least one of FIGS. 4 and 5 or 6 to 9.

Figure 3:
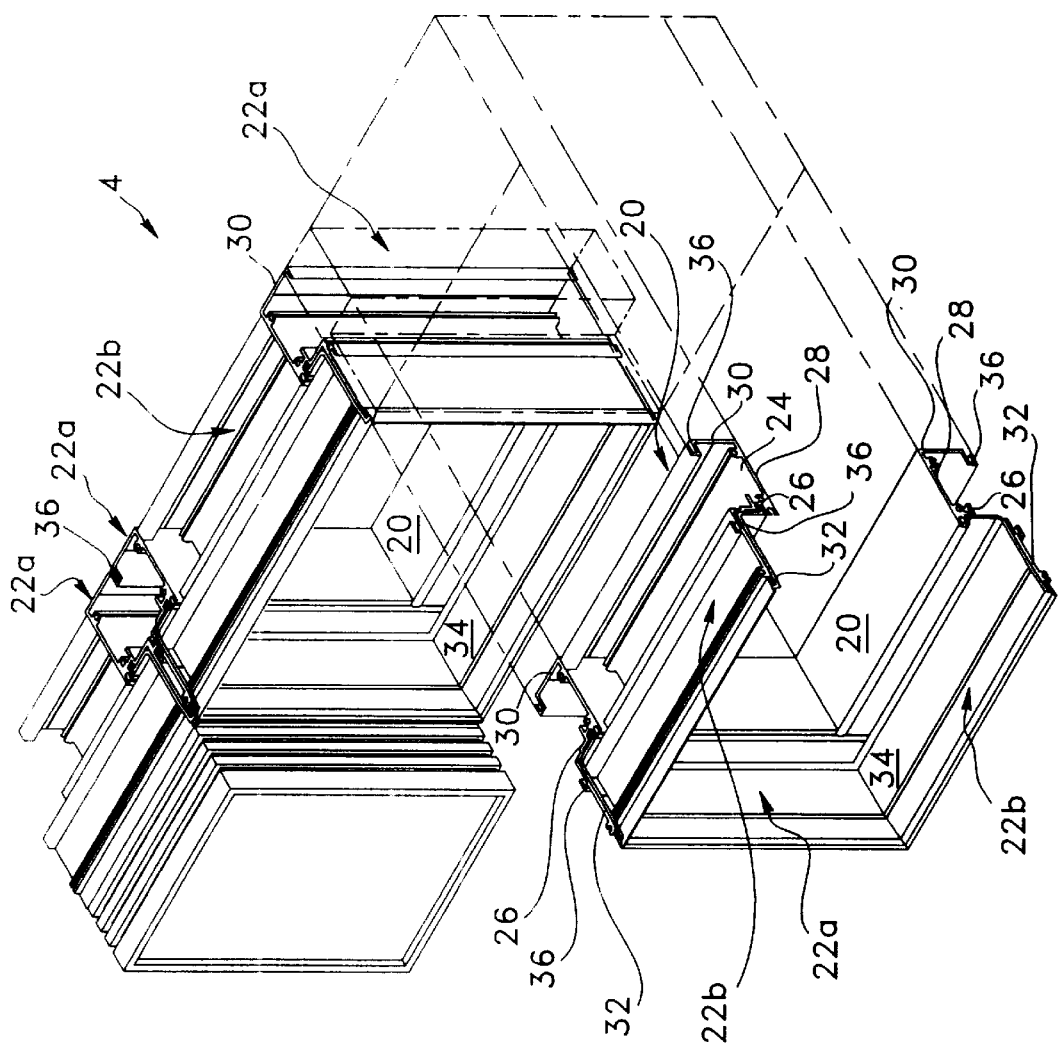
FIG. 3 is a perspective partially exploded view of three side-by-side window cases as shown in FIG. 1 with their pane frame removed.

The window case (4) comprises a box-like main frame (20), as best shown in FIG. 3, formed of four sections (22) including a pair of vertical sections (22a) and a pair of horizontal sections (22b). Each section (22) has a rearward portion adapted to be recessed into a window opening (10) in the wall (3). Preferably, the rearward portion consists of an outwards open U-shaped channel (24) extending longitudinally along the section (22). A front sidewall (26), an inner bottom wall (28) and a rear sidewall (30) are defining the channel (24). The section (22) further comprises a frontward portion devised to extend outside the building. Preferably, the frontward portion consists of a limb (32) extending longitudinally along the section (22) and frontwards from an outer edge portion of the front sidewall (26). As can be appreciated from FIG. 3, the limbs (32) of each of the vertical sections (22a) and the horizontal sections (22b) define together an intermediate window frame (34).

Figure 7:
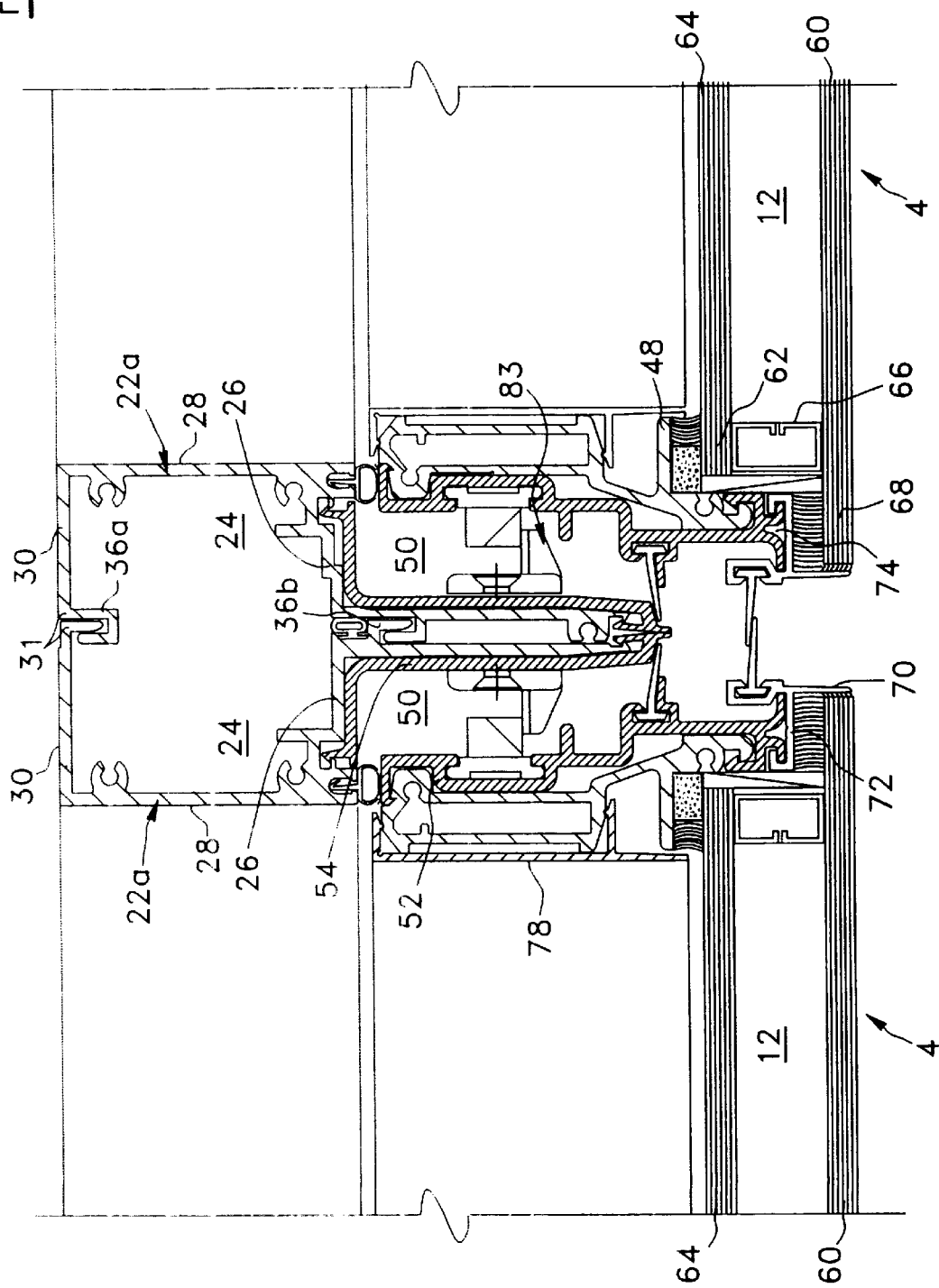
FIG. 7 is a cross-sectional view along line VII—VII of FIG. 2, showing a vertical joint between two adjacent window cases.

Each section (22) has at least one hook-shaped engagement member (36) adapted to interlock with a corresponding hook-shaped engagement member provided on an adjoining section (22) of an adjacent window case (4), as shown in FIG. 3 and FIG. 7. As best seen in FIG. 7, a first (36a) hook-shaped engagement member is provided at an outer edge (31) of the rear sidewall (30) and a second (36b) is provided on an outer surface of the limb (32).

Figure 4:
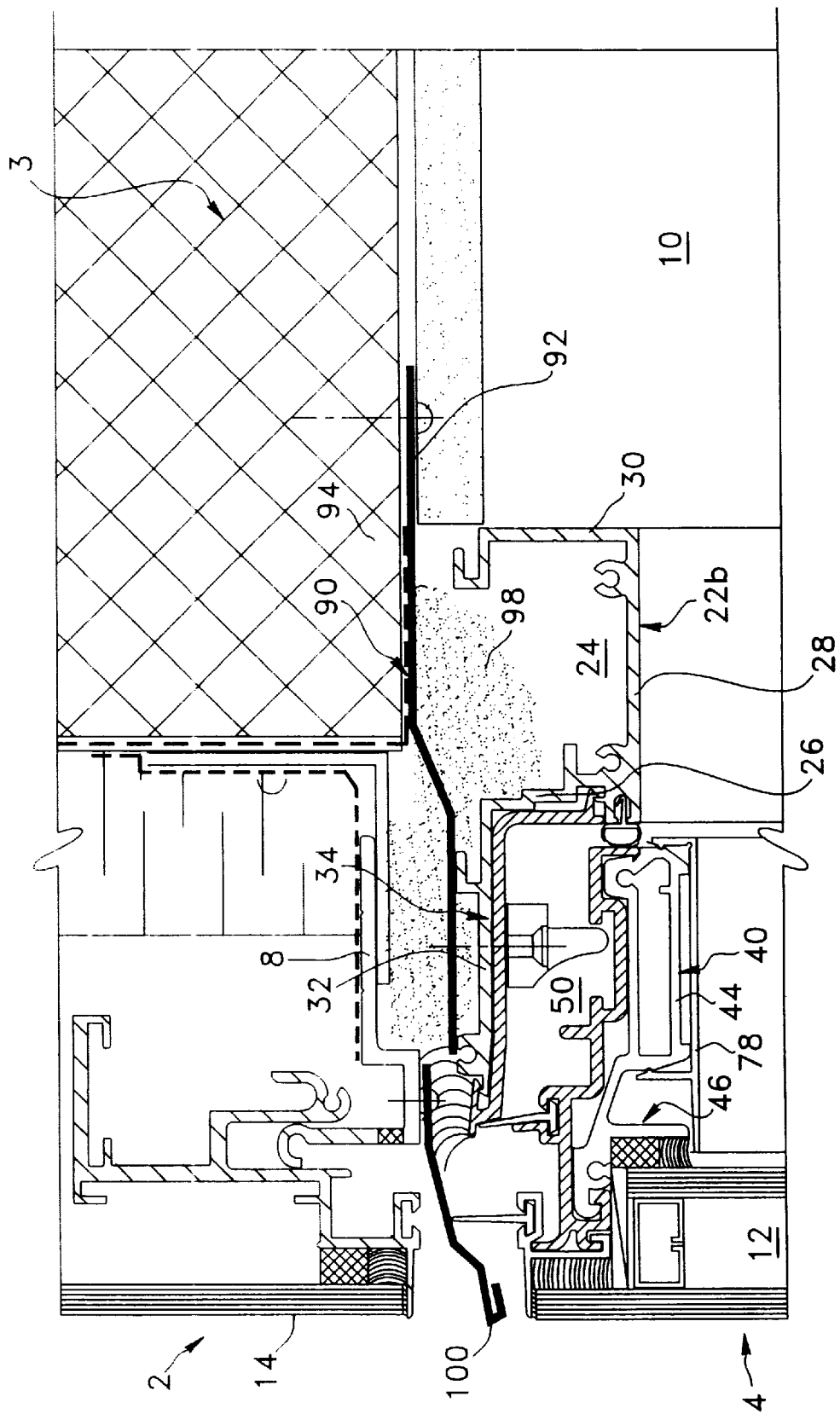
FIG. 4 is a cross-sectional view along line IV—IV of FIGS. 1 and 2 showing the junction between the bottom of a tympan glass panel and the head of a window case.
Figure 5:
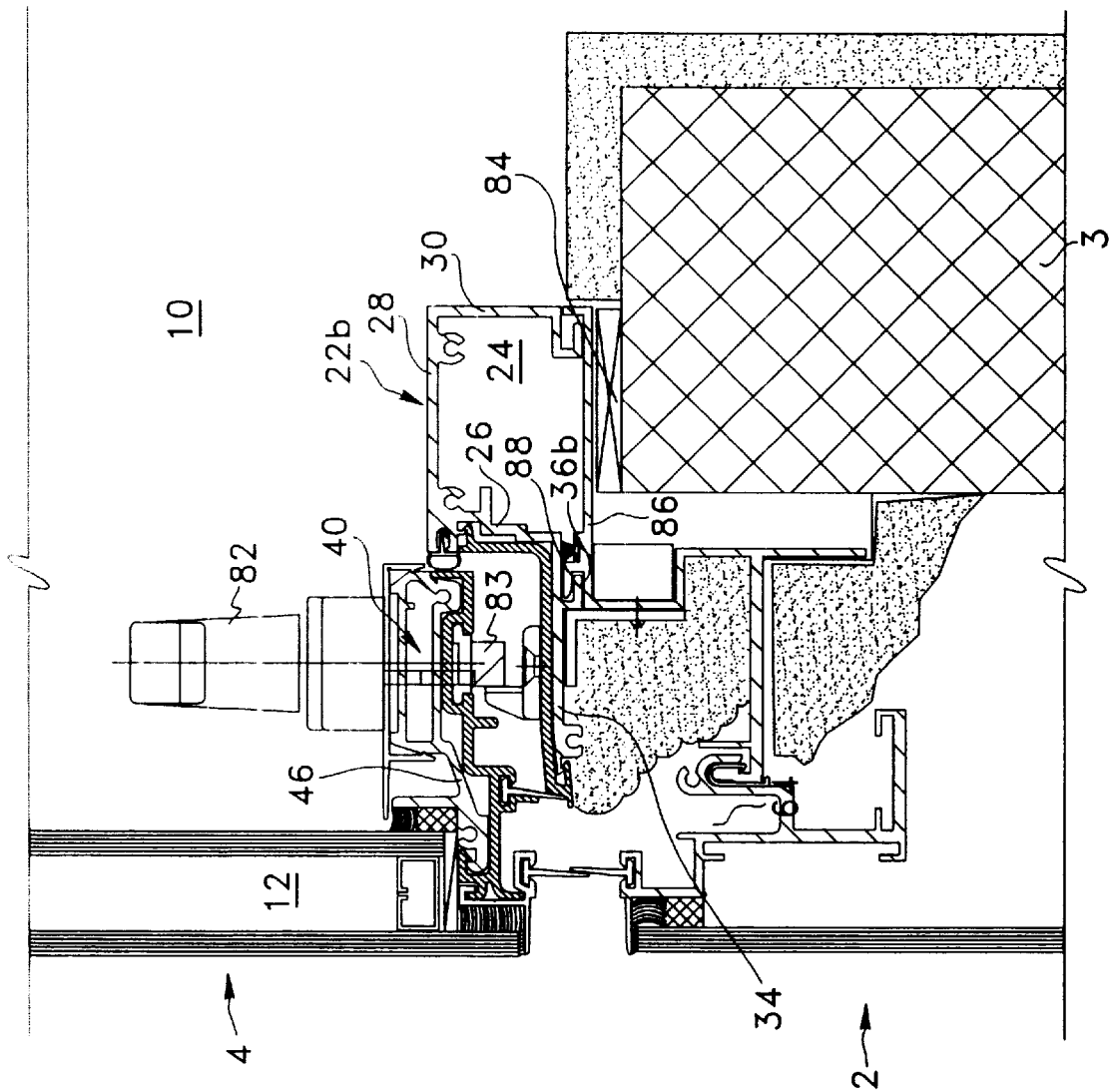
FIG. 5 is a side view of the bottom portion of the building system of FIG. 1 showing the junction between the bottom of a window case and the head of a tympan glass panel.

Referring now more particularly to FIGS. 4 and 5, a pane frame (40) sized to fit in the intermediate window frame (34) is mounted therein. A window pane (12) is secured to a window pane securing portion of the pane frame (40). More particularly, the pane frame (40) is formed of four framing members including a pair of vertical framing members and a pair of horizontal framing members. Each of the framing members has a body (44) mounted along a corresponding limb (32) and an arm (46) extending frontwards and outwards from the body (44) so as to substantially hide the main frame or the sections (22) of the main frame when the window case (4) is viewed from outside the building. The arm (46) has a bonded portion (48), corresponding to the window pane securing portion mentioned before, bonded to a back surface of the window pane (12).

As can be appreciated, the body (44) and the arm (46) are spaced-apart from their corresponding limb (32) and a gap (50) is defined between the limb (32) and the pane frame (40). As indicated in FIG. 7, a first thermal insulator (52) is secured to and is covering the body and arm of the pane frame (40). Also, a second thermal insulator (54) is secured to and is covering the inner surface of the limb (32).

Preferably, a strip of sealing materiel (56) extending towards the limb (32) is inserted in a gasket pocket (58) provided on an outer face of the first thermal insulator (52) to sealingly close the gap (50) defined between the first (52) and the second thermal insulator (54). As will be more fully described hereinbelow, the hardware required for mounting the pane frame (40) into the intermediate window frame (34) is located in the gap (50).

Figure 6:
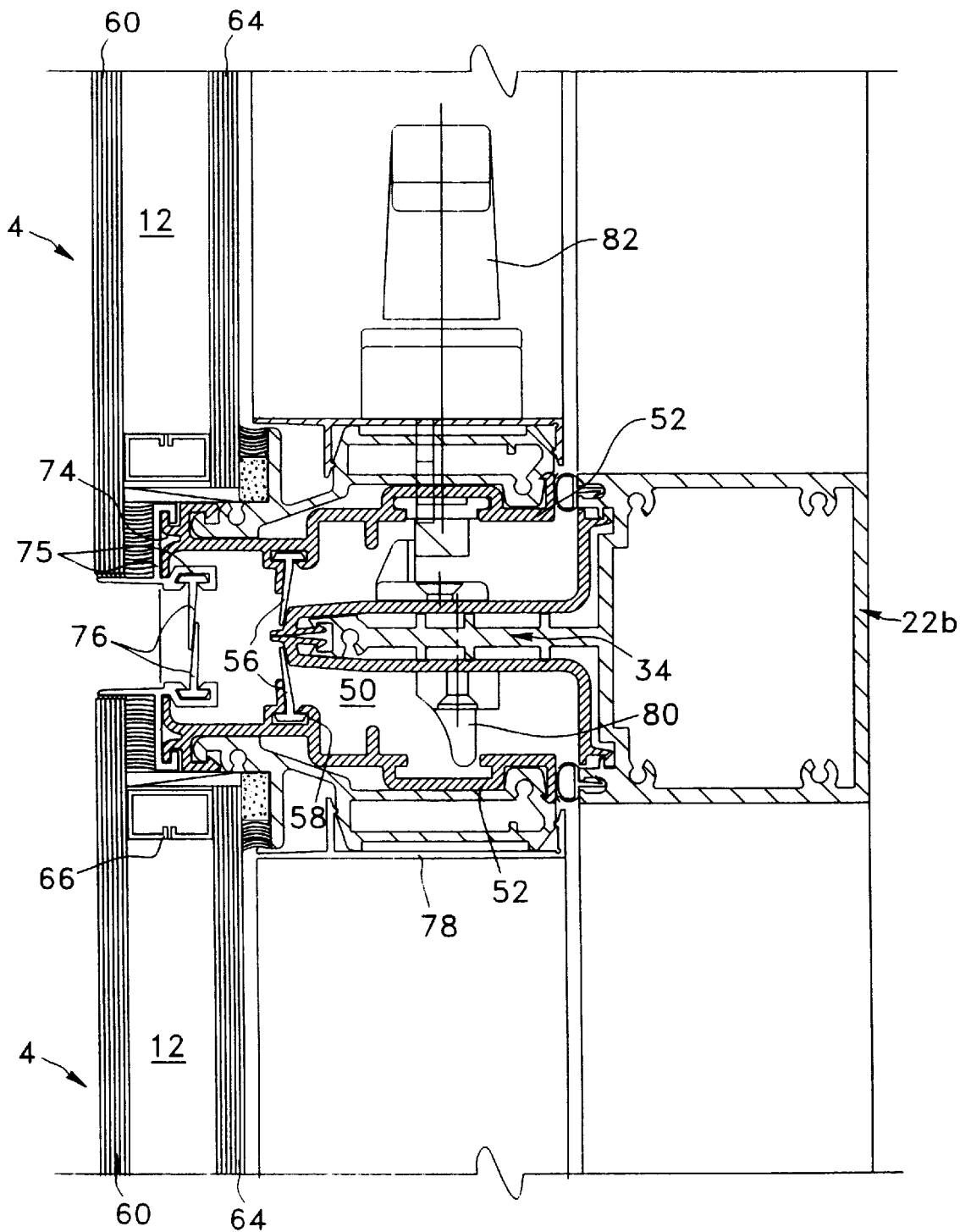
FIG. 6 is a cross-sectional view along line VI—VI of FIG. 2 showing the junction between the head of a first window case with the bottom of a second window case.

As best indicated in FIGS. 6 and 7, the window pane (12) is preferably a double-glazed pane having a front glazing sheet (60), a rear glazing sheet (64) and a separator (66) therebetween. The front glazing sheet (60) has an outline rim (68) outreaching the outline (62) of the rear glazing sheet (64). The bonded portion (48) of each arm (46) of the pane frame (40) is bonded to the outline (62) of the rear glazing sheet (64).

An edge cap (70) is covering the outline rim (68) of the front glazing sheet (60). This edge cap (70) comprises a flange (72) having a front face bonded to the outline rim (68) and a back face comprising a gasket pocket (74) in which an end of the first thermal insulator (52) is inserted. An adhesive material such as silicone and/or high density neoprene is suitable for bonding the window pane (12) to the pane frame (40) and to the thermal insulator (52). As can be appreciated, the thermal insulator (52) is perfectly sealing the joint between the window pane (12) and the pane frame (40).

The edge cap (70) comprises another gasket pocket (75) in which a strip of sealing material (76) such as synprene or neoprene is inserted along the edge of the window pane (12). This strip (76) is made wide enough to reach a mating strip provided on an adjacent window case (4), as shown in FIG. 6, or an adjacent panel structure (2), as shown in FIG. 5, to thereby seal the joint therebetween.

A finishing cover (78) may be provided for covering and hiding the inner surface of the body (44) of the pane frame (40).

A window case according to the present invention may be either an opening window or non-opening window. Referring to FIGS. 4 and 5, an opening window case is illustrated. In that case, the upper horizontal frame members of the pane frame (40) shown in FIG. 4 is pivotally hinged to the limb (32) of the main window frame (20) by means of a conventional hinge (80). It has to be noted that the reference numeral (80) appears in FIG. 7. A handle (82) and a lock (83) for the window may be operatively mounted on the lower horizontal framing member, as shown in FIG. 5.

Referring to FIG. 5, the window case (4) is mounted in an opening (10) of the wall (3) by: a) setting and b) affixing the channel (24) of the lower horizontal section (22b) of the main frame on the base ledge (84) of the opening (10), preferably on a bracket (86) fixed over the base ledge (84), with the intermediate window frame (34) and pane frame (40) protruding from the existing wall. Advantageously, the bracket (86) has at least one hook-shaped engagement member (88) interlocking with a hook-shaped engagement member (36) of the main frame (20).

Figure 8:
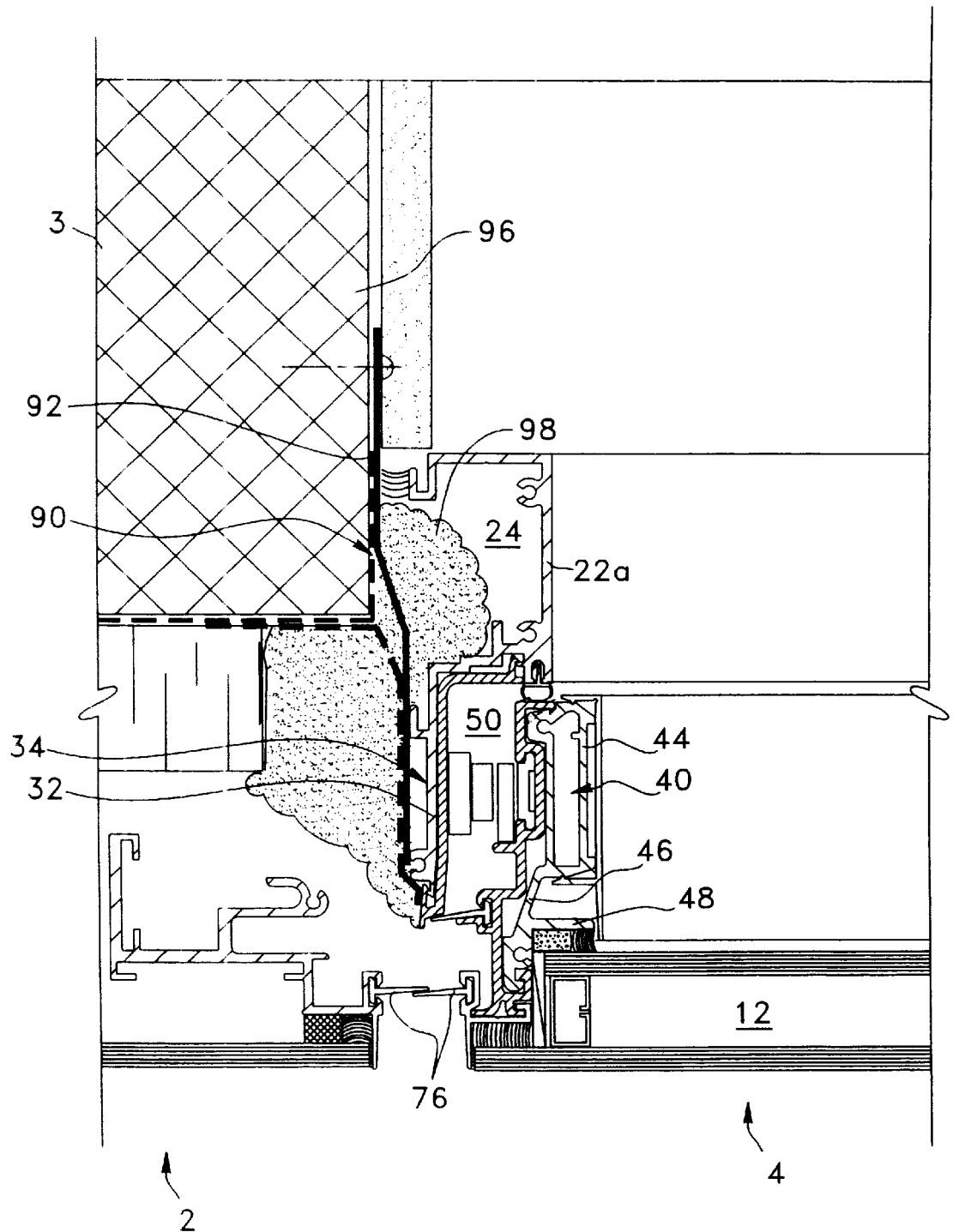
FIG. 8 is a cross-sectional view along line VIII—VIII of FIG. 2 showing a vertical joint between a window case with a panel.
Figure 9:
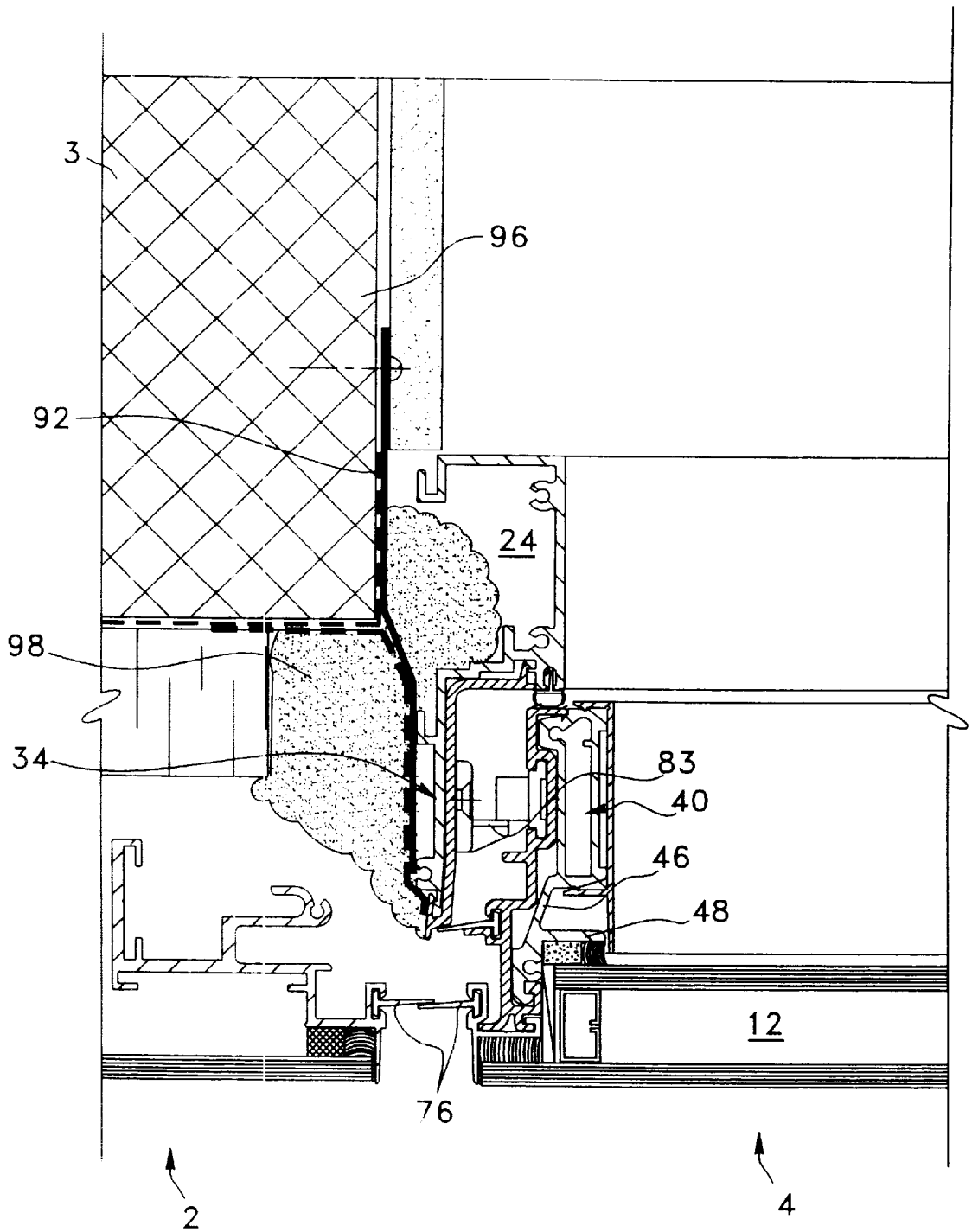
FIG. 9 is a cross-sectional view along line IX—IX of FIG. 2.

Then, an anchor plate (90) is fixed to an outer surface of the limb (32) of the upper horizontal section (22b), as shown in FIG. 4, or of a vertical section, as shown in FIG. 8 or 9, such that the anchor plate (90) extends longitudinally along the limb (32) and that a fixing part (92) of the anchor plate (90) extends beyond the rear sidewall (30) of the main frame. The fixing part (92) is then secured to the overhanging ledge (94) or the side ledge (96) of the opening (10).

The gap defined between the wall (3) and the sections (22) may be filled with an insulating foam material such as urethan foam (98). Also preferably, to prevent leaks in the upper part of the window case (4), a water evacuation plate (100) is installed above each window case (4).

Referring to FIGS. 1, 2 and 7, another window case (4) may be installed adjacent to a first window case (4). In that case, as shown in FIG. 7, these window cases (4) have adjoining vertical sections forming a mullion (22a) and interlocking hook-shaped engagement members (36).

FIGS. 1, 2 and 6 show that a window case (4) may also be installed over a first window case (4). In that case, the adjoining horizontal sections (22b) are formed with a single section forming a transom.

As can be appreciated, a building panel system according to the present invention is very aesthetical as no window framing is apparent from the outside of the building. Furthermore, such a building panel system not only looks like a curtain wall but it also provides all the advantages of a conventional wall, such as a good thermal insulation. It may be used for renovating an existing wall or for sheathing a new construction. The external wall system of the present invention makes it possible to easily sheath a building with a wide range of facing materials such as aluminum, glass, marble, ceramic, acrylic or any other suitable material including opening and non opening windows, as desired, thereby rendering the design of the facing very easy and providing a continuous water and vapour sealed.

A window case according to the present invention is also easily interchangeable and its replacement or reparation is very simple.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

What is claimed is:

1. A prefabricated window assembly for installation in a window opening of a building, the window assembly comprising:
    a box-shaped main frame formed of a pair of vertical sections and a pair of horizontal sections, each section having,
    a rearward portion adapted to be recessed into the window opening of the building, the rearward portion comprising an outwardly open U-shaped channel extending longitudinally along the section, the U-shaped channel having a front sidewall, an inner bottom wall and a rear sidewall opposite the front sidewall, and
    a frontward portion for protruding out of the building once the window assembly is installed in the window opening and comprising a limb extending longitudinally along the section and frontwards from an outer edge portion of the front sidewall of the U-shaped channel; the frontward portion of the vertical sections and the horizontal sections defining together an intermediate window frame;
    a pane frame sized to fit in the intermediate window frame and mounted therein, the pane frame being formed of a pair of vertical framing members and a pair of horizontal framing members, each of said framing members having a body mounted along a corresponding one of said frontward portions of the main frame and an arm extending frontwards and outwards from the body so as to substantially hide the main frame when viewed from outside the building when said assembly is mounted in the building, each body and each arm being spaced-apart from a corresponding one of said limbs, and each of said arms having a window pane securing portion;
    a first thermal insulator secured to and covering each said body and arm of said pane frame;
    a second thermal insulator secured to and covering an inner surface of each of said limbs; and
    a window pane having edges each secured to a corresponding one of said window pane securing portions of the pane frame.

2. A prefabricated window assembly as claimed in claim 1, wherein each of said sections has at least one hook-shaped engagement member adapted to interlock with a corresponding said hook-shaped engagement member provided on another said window assembly.

3. A prefabricated window assembly as claimed in claim 2, wherein said at least one hook-shaped engagement member of each of said sections comprises a first hook-shaped engagement member provided at an outer edge of the rear sidewall of each of said sections.

4. A prefabricated window assembly as claimed in claim 3, wherein said at least one hooked-shaped engagement member of each of said sections further comprises a second hook-shaped engagement member provided on an outer surface of each of said limbs.

5. A prefabricated window assembly as claimed in claim 1, wherein the window pane is a double-glazed pane having a front glazing sheet, a rear glazing sheet and a separator therebetween, and wherein the window securing portion of each arm of the pane frame is bonded to an outlining rim of the rear glazing sheet.

6. A prefabricated window assembly as claimed in claim 5, wherein the front glazing sheet has an outline rim outreaching the outlining rim of the rear glazing sheet, the outline rim of the front glazing sheet being provided with an edge cap having a front face bonded to said outline rim of the front glazing sheet and a back face comprising a gasket pocket in which an end of said first thermal insulator is inserted.

7. A prefabricated window assembly as claimed in claim 6, wherein the first thermal insulator has an outer face comprising a gasket pocket in which a strip of sealing material extending toward a corresponding one of said limbs is inserted to sealingly close a gap defined between the first and second thermal insulators.

8. A prefabricated window assembly as claimed in claim 5, wherein one of the horizontal framing members of the pane frame in an upper framing member pivotally hinged to a corresponding one of said limbs.

9. A prefabricated window assembly as claimed in claim 1, wherein the window pane securing portion are bonded to a back surface of the window pane.

10. A method of mounting a prefabricated window assembly as defined in claim 1 in an opening of an existing wall of a building, the opening being defined by at least a base ledge, the method comprising the steps of:
    a) setting the rearward portion of one of the horizontal sections of the main frame on the base ledge of the opening with the intermediate window frame and pane frame protruding from the existing wall; and
    b) affixing the rearward portion of said one of the horizontal sections to the base ledge.

11. The method as claimed in claim 10, further comprising a step of: mounting another window assembly as defined in claim 1 adjacent to said window assembly such that one of the vertical sections of said another window assembly is adjoining one of the vertical sections of said window assembly, said step comprising interlocking a hook-shaped engagement member provided on the one of the vertical sections of said window assembly to a corresponding hook-shaped engagement member provided on the one of the vertical sections of said another window assembly.

12. A building panel system covering an exterior wall surface of a building comprising:
    a plurality of rows of panel structures hooked side-by-side on supporting rails fixed on the exterior wall surface of the building; and at least one window assembly as defined in claim 1 mounted in an opening of the exterior wall and disposed adjacent to at least one of said panel structures, the window pane of the window assembly and said adjacent panel structure having an adjoining edge and coplanar front surfaces.

\* \* \* \* \*

UNITED STATES PATENT AND TRADEMARK OFFICE
CERTIFICATE OF CORRECTION

PATENT NO.    : 6,442,907 B1                                              Page 1 of 1
DATED         : September 3, 2002
INVENTOR(S)   : Doyon et al.

It is certified that error appears in the above-identified patent and that said Letters Patent is hereby corrected as shown below:

<u>Title page, Item [54] and Column 1, line 1,</u>
Should read:
-- [54]  WINDOW CASE ASSEMBLY AND METHOD FOR MOUNTING SAME IN WINDOW OPENING OF BUILDING --

Signed and Sealed this

Twenty-sixth Day of August, 2003

JAMES E. ROGAN
*Director of the United States Patent and Trademark Office*